March 17, 1970  W. J. PARKIN  3,501,740
ACOUSTIC DIRECTION FINDER

Filed Jan. 31, 1969  2 Sheets-Sheet 2

INVENTOR.
WILLIAM J. PARKIN
BY

*AGENT*

United States Patent Office 3,501,740
Patented Mar. 17, 1970

3,501,740
ACOUSTIC DIRECTION FINDER
William J. Parkin, Wayland, Mass., assignor to Sanders Associates, Inc., Nashua, N.H., a corporation of Delaware
Filed Jan. 31, 1969, Ser. No. 795,602
Int. Cl. G01s 3/00
U.S. Cl. 340—6                10 Claims

ABSTRACT OF THE DISCLOSURE

There is disclosed herein an acoustic direction finder wherein orthogonal input transducers convert acoustic waves into displacement of an aperture upon which a light source is imaged. Motion of the aperture results in the movement of a light spot on a rotating field detector element the output of which is indicative of the direction of arrival of the acoustic waves.

BACKGROUND OF THE INVENTION

Field of the invention

The present invention relates generally to the field of acoustics and in particular to apparatus for determining the direction of a sound path.

DESCRIPTION OF THE PRIOR ART

The direction of a sound path is an important factor in a variety of fields including seismic exploration, marine navigation and underwater detection as well as military applications wherein it is desired to locate a remote sound source such as a gun, mortar or the like.

Prior to the present invention the existing directional microphones exhibited generally poor directional characteristics and required the use of widely spaced multiple microphones. An improvement in directional sound detection is described in U.S. Patent 2,982,942 which issued to James E. White on May 2, 1961 wherein apparatus for detecting the velocity component of the acoustic wave is set forth. Such velocity or rate sensitive devices characterically suffer from degraded performance when it is desired to detect low frequency acoustic waves since the output decreases as the frequency decreases for constant power sources. Further limitations of such apparatus lie in the fact that the direction indicating signal may not be generated prior to the time the peak of an acoustic pulse is received, low frequency audio circuitry is required, wide dynamic range is generally unavailable and when overloaded the apparatus requires a relatively long recovery time.

OBJECTS AND SUMMARY OF THE INVENTION

It is therefore a primary object of the present invention to provide a new and novel device for determining the direction of a sound path.

It is another object of the present invention to provide apparatus of the above described character which is displacement sensitive.

It is a further object of the present invention to provide apparatus of the above described character having high sensitivity.

It is an additional object of the present invention to provide apparatus of the above described character which produces a direction indicating signal before the peak pulse is received.

It is still another object of the present invention to provide apparatus of the above described character which requires no low frequency audio circuitry.

It is yet a further object of the present invention to provide apparatus of the above described character having wide dynamic range.

It is also an object of the present invention to provide apparatus of the above described character which has a substantially immediate recovery after an overload.

The foregoing and other objectives of the invention are achieved through the practice of the present invention wherein a transducer assembly including two orthogonal pairs of input diaphragms converts the acoustic waves into orthogonally directed displacement components. A plate having a narrow transverse slit therein is coupled between each of the diaphragm pairs. The intersection of the slits in the orthogonal plates thus defines an aperture which is displaced as the plates move in response to acoustic waves incident upon the diaphragms. A light source is imaged on the aperture and light passing therethrough is focused on an A.C. biased rotating field detector, which indicates the position of an image or spot of radiation on its surface. The output signal of the detector is a carrier signal of a phase proportional to the direction of the sound source and amplitude proportional to the acoustic power received and inversely proportional to the received frequency.

The foregoing as well as other objects, features and advantages of the present invention will become more apparent from the detailed discussion taken in conjunction with the appended drawings.

DESCRIPTION OF PREFERRED EMBODIMENT

Figure 1:
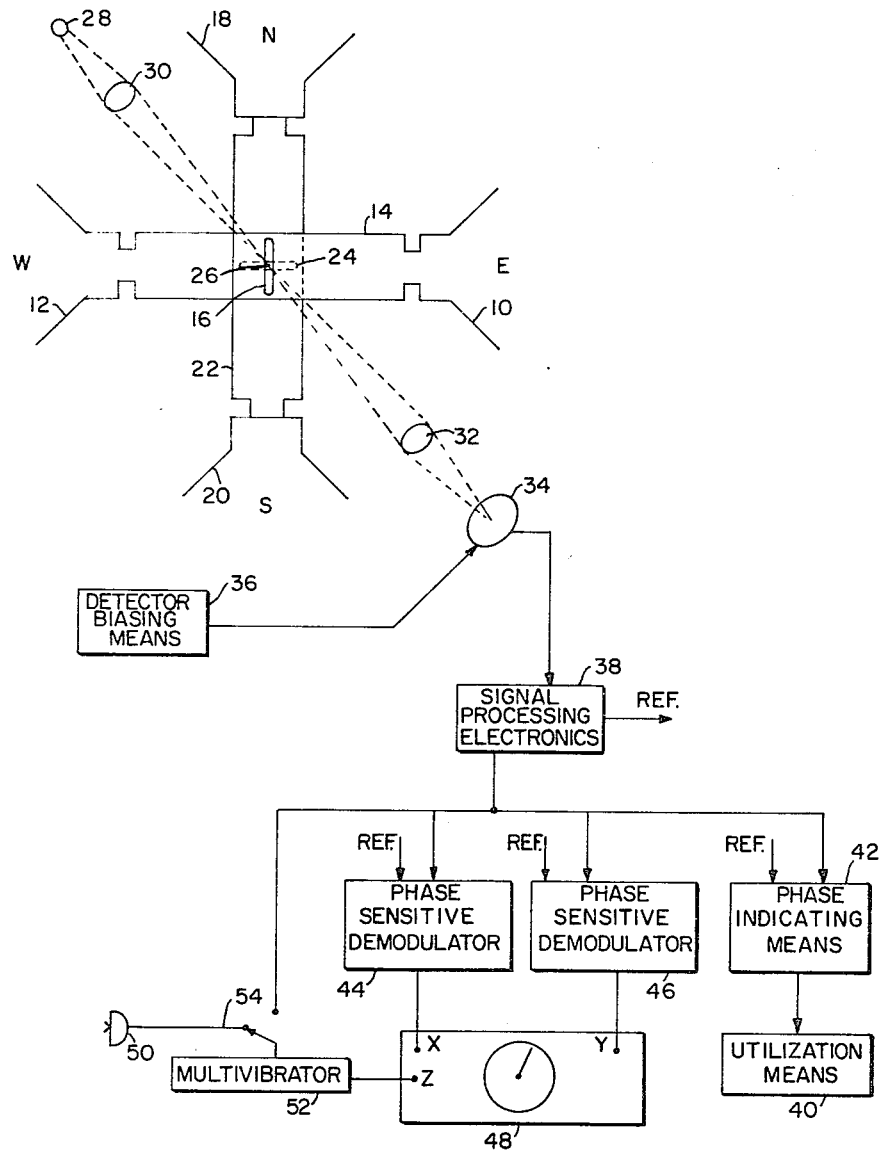
FIGURE 1 is a schematic illustration of apparatus according to the principles of the present invention.

Turning now to FIGURE 1 there is schematically illustrated a top view of the apparatus of the present invention. A first pair of diaphragms 10 and 12 are coupled together by a first coupling member 14 having a narrow transverse slit 16 therein. A second pair of diaphragms 18 and 20 coupled by a second member 22 are disposed at a right angle to the first member 14. The second coupling member 22 also has a narrow transverse slit 24 disposed therein. The members 14 and 22 thus are orthogonally disposed in close proximity to each other although not in contact and the intersection of the slits 16 and 24 form a small aperture 26. As sound fronts or pulses pass this assembly, the diaphragms 10, 12, 18 and 20 are displaced along the longitudinal axes of their respective coupling members 14 and 22 by a distance which is directly proportional to the amplitude of the acoustic wave and inversely proportional to the frequency of the wave. This displacement of the diaphragms results in a displacement of the aperture 26 defined by the crossed slits 16 and 24, in the direction of propagation of positive pressure pulses. Motion of diaphragms 10 and 12 effectively move the aperture 26 to the north or south while motion of the orthogonal pair of diaphragms 18 and 20 moves the aperture east or west. The two components of the aperture motion are thus completely independent. A light source 28 is imaged by lens 30 on the aperture 26 and light passing through the aperture is collected by lens 32 and focused on a rotating field detector element 34.

A rotating field detector element which is useful in the practice of the present invention is described in detail in the applicant's co-pending application Ser. No. 316,203 filed Oct. 10, 1963 entitled "Sensing and Tracking Apparatus" and assigned to the same assignee as the present application. Briefly, the rotating field detector is a radiation responsive, variable impedance detector element biased with a pair of quadrature phase alternating current bias signals from a detector biasing means 36. The output signal of the detector 34 due to its quadrature phrase is indicative of the position of a radiation source on the surface of the detector element. The detector output is coupled to signal processing electronics 38 which includes suitable signal amplifiers and a source of quadrature phase reference signals. The output carrier signal is at the bias signal frequency and of a phase indicative of the direction of the sound source which activates the transducer elements. The signal processing electronics 38 operate at the carrier frequency which may be for example 50 kHz. and need not operate at low audio frequencies.

As a sound pulse is received by the apparatus and builds toward its first pressure peak many cycles of the carrier phase angle information become available. This signal may be applied to a variety utilization means 40 through a phase indicating means 42. Utilization means could include such apparatus as recorders, tracking systems, sound ranging equipment and the like. This signal may also be coupled through a pair of phase sensitive demodulators 44 and 46 which detect the quadrature phase components of the carrier signal which are applied to the X and Y inputs of a display means 48.

The apparatus of the present invention is primarily intended to sense positive pressure pulses associated with acoustic waves and unless compensated the negative pressure region which characteristically follows the positive pressure peak of an acoustic wave will introduce a 180 degree ambiguity into the output of the detector element 34. Any such ambiguities in the apparatus may be eliminated through the use of a pressure sense microphone 50. The microphone output may be used to trigger a one shot multivibrator 52 coupled to the Z axis drive of the display means 46 and thereby resolve the polarity ambiguity by reversing the polarity with which negative pressure portion of oscillating acoustic signals are displayed. In the alternative, for acoustic pulse detection the signal processor output may be applied to the display means 48 through the one shot multivibrator 52 such as to trigger the Z axis drive on the first received positive pressure pulse and block further signals for a predetermined period of time. Both of the foregoing means for resolving polarity ambiguities due to oscillating acoustic pulses may be provided in the apparatus and a particular means selected by the position of switch 54.

If it is desired to determine the direction of a sound source such as a large gun at great distance it is generally preferred to detect low frequencies. The displacement of transducers 10 and 12, 18 and 20 is inversely proportional to frequency and the rotating field detector 34 is a displacement sensitive device. Therefore the amplitude of the detector output, which is proportional to the displacement of the light spot from the center of the detector element, increases as the acoustic frequency decreases for constant power sources.

The diaphragms 10, 12, 18 and 20 may for example be simple loudspeakers which are well known in the art. Relatively inexpensive speakers have been found by the applicant to be capable of a rather large amplitude of motion when properly excited. Loudspeakers also offer the advantage that they may easily be damped by either shorting the unused voice coils or by coupling the outputs of demodulators 44 and 46 to the proper voice coils. The coupling members 14 and 22 may be formed of any suitable material which is both light weight and rigid.

Figure 2:
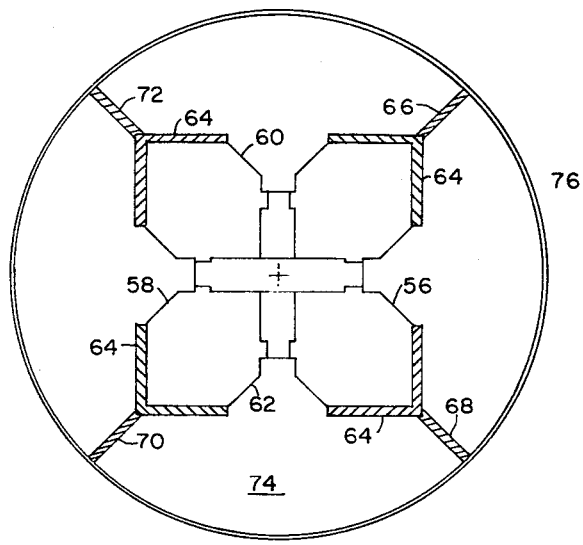
FIGURE 2 is a schematic illustration of an alternative embodiment of the input transducers of the present invention.

FIGURE 2 illustrates an alternative embodiment of an input transducer assembly useful in the practice of the present invention wherein the sensitivity to low frequency acoustic waves is improved. The diaphragms 56, 58, 60 and 62 are mounted in a suitable acoustic cabinet 64 to which quadrant baffles 66, 68, 70 and 72 are affixed. The baffles are an effective way to enlarge the size of the cabinet 64 and improve the acoustic impedance match of the apparatus to low frequency sound waves. A plate 74 may be added at the top (not shown) and bottom on the cabinet 64 and baffles 66, 68, 70 and 72 such that suitable protective means 76 may be readily attached as required for outdoor use of the apparatus. The protective means 76 may for example be a polyethylene sheet which provides protection from the weather while being sufficiently compliant to permit the efficient transfer of acoustic waves.

Figure 3:
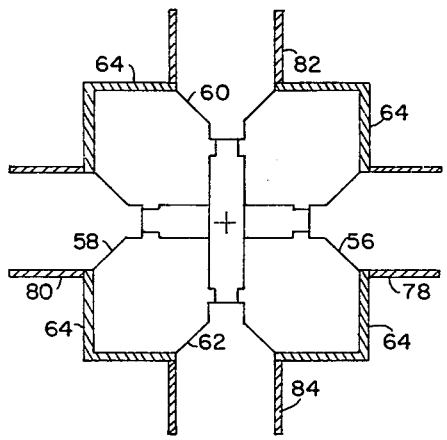
FIGURE 3 is a schematic illustration of another embodiment of an input transducer useful in the present invention.

FIGURE 3 illustrates another embodiment of an acoustic transducer assembly which may be used to advantage in the present invention. Elements common to those shown in FIGURE 2 are identified by like numerals. In this embodiment each of the diaphragms 56, 58, 60 and 62 have associated therewith a tuned port 78, 80, 82 anad 84 respectively. The dimensions of these ports are selected to provide an acoustic impedance match at the frequency which is desired to be detected. Each tuned port is affixed to the cabinet 64 such that the respective diaphragms are effectively disposed at the ends of individual tuned cavities.

It will thus be seen that the objects set forth above, among those made apparent from the preceding description are efficiently attained and, since certain changes may be made in the above construction without departing from the scope of the invention, it is intended that all matter contained in the above description or shown in the appended drawings be interpreted as illustrative and not in a limiting sense.

Having described what is new and novel and desired to be secured by Letters Patent, what is claimed is:

1. Apparatus for determining the direction of a sound path comprising
    means for transducing an acoustic wave into orthogonally directed displacement components,
    means coupled to said transducing means for forming an aperture which is displaced in response to an acoustic wave incident upon said transducing means,
    means for detecting displacement of said aperture with respect to a preselected fixed position, and
    signal processing means coupled to said detecting means for providing an output signal representative of the orthogonal components of said acoustic wave to thereby indicate the direction in which said acoustic wave moves.

2. Apparatus as recited in claim 1 wherein
    said transducing means comprises two orthogonal pairs of opposed diaphragms which are displacement sensitive to the orthogonal components of acoustic waves.

3. Apparatus as recited in claim 2 wherein
    said aperture forming means comprises two orthogonal coupling members,
    one coupling member being coupled between each of said orthogonal pairs of opposed diaphragms,
    each said coupling member having a transverse slit disposed therein at substantially the longitudinal midpoint thereof, and
    the intersection of said transverse slits thereby forming an aperture which is displaced in response to displacement of said diaphragms by acoustic waves.

4. Apparatus as recited in claim 1 wherein said displacement detecting means comprises
    a light source,
    means for imaging said light source upon said aperture,
    a light sensitive detector element producing an output signal representative of the position thereon at which light energy is impingent, and
    means for focusing light passed by said aperture on said detector element at a position thereon corresponding to the position of said aperture.

5. Apparatus as recited in claim 4 further including means for biasing said detector element with a pair of alternating current quadrature phase bias signals.

6. Apparatus as recited in claim 5 wherein the output signal from said detector element is a quadrature phase alternating current signal representative of the orthogonally directed displacement components of said aperture produced by acoustic waves impingent upon said diaphragms.

7. Apparatus as recited in claim 1 further including means for resolving polarity ambiguity of said acoustic waves whereby the direction of negative pressure acoustic waves is indicated.

8. Apparatus as recited in claim 7 wherein said resolving means comprises a pressure sense microphone, operative to reverse the polarity of an output signal corresponding to negative pressure portions of said acoustic wave.

9. Apparatus as recited in claim 2 wherein said diaphragms are disposed in an acoustic cabinet, and quadrant acoustic baffles are affixed to said cabinet such as to substantially acoustic impedance match said diaphragms to said acoustic wave.

10. Apparatus as recited in claim 2 wherein said diaphragms are disposed in an acoustic cabinet, and tuned ports are affixed to said cabinet such as to form a tuned cavity about each of said diaphragms.

References Cited
UNITED STATES PATENTS 2,787,736   3/1957   Ellison et al. _____ 340—16 X RICHARD A. FARLEY, Primary Examiner U.S. Cl. X.R.

340—16